Figure 1:
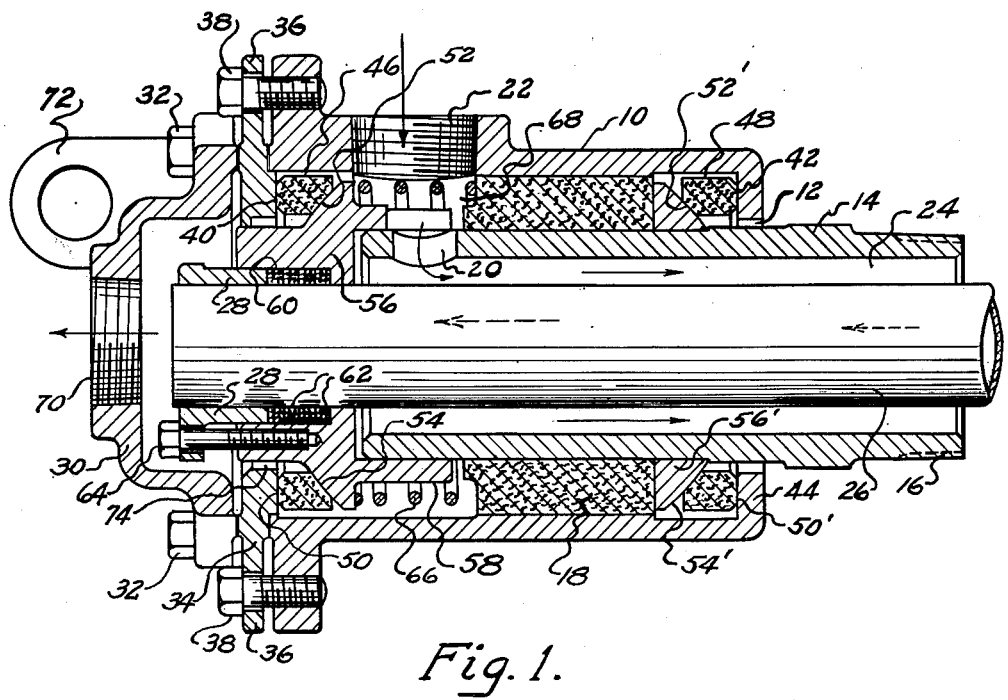

May 7, 1957 R. O. MONROE 2,791,449
ROTARY SELF-SUPPORTING PRESSURE JOINT
Filed Jan. 19, 1953

INVENTOR
ROLLO O. MONROE
BY
ATTORNEY

United States Patent Office 2,791,449
Patented May 7, 1957

2,791,449

ROTARY SELF-SUPPORTING PRESSURE JOINT

Rollo O. Monroe, Three Rivers, Mich., assignor to The Johnson Corporation, Three Rivers, Mich., a corporation of Michigan Application January 19, 1953, Serial No. 332,016

1 Claim. (Cl. 285—134)

This invention relates to improvements in rotary fluid pressure joints of the kind which are required to be connected to rotary drums or cylinders, as employed for example upon rubber masticators and the like, and which incorporate a rotary fluid sealed joint connection between a rotary steam or other fluid pressure pipe and the joint casing. In particular, the invention relates to improvements in the rotary fluid pressure sealed joints as disclosed in the prior Patent Number 2,385,421 and Re-issue Patent Number Re. 23,298 in my name.

With the adoption of these rotary fluid pressure sealed joints in different industrial fields it has become necessary to give attention to providing a combined self supporting and swingable fluid sealed joint which is capable of application to rotary drums or cylinders of relatively large diameter and lengths, yet which are effectively sealed against fluid loss under all conditions of operation; in which provision has to be made to provide for limited relative swinging and axial movement of the joint parts to compensate for lateral and other movements of the drums or cylinders to which the joints are applied, including vibration, and in the case of calendar and rubber masticating rolls, for example, the considerable lateral movement which is encountered in operation.

It is an object of the present invention, therefore, to provide an improved rotary fluid pressure joint which is capable of being self supported with respect to a rotary nipple attachment to a rotary machine part, such as a calendar or masticating cylinder or drum, and which is also selfadjustable in compensating relationship to swinging and longitudinal movements of the nipple and also to wear on the joint sealing surfaces.

The above, and further objects and advantages residing in the construction, arrangement and combination of parts will become apparent from a consideration of the following detail description of one practical embodiment of the invention with reference to the accompanying drawing and from the appended claim.

The accompanying drawing is a longitudinal section of said embodiment of the invention.

Referring to the drawings, 10 indicates the fixed cylindrical casing of my improved joint assembly, which casing has an end opening 12 through which a nipple pipe 14 passes with all around clearance, this nipple being secured to a rotary drum (not shown) as by screwthreading 16. The rotary drum may be one of the rotary drums of a rubber roll mill.

The casing 10 is supported upon the nipple tube 14 through the medium of an elongated bearing sleeve 18, which sleeve is conveniently made from carbon graphite and has a close sliding fit with respect to the inside surface of the casing 10 and the outside surface of the nipple tube. This bearing sleeve 18 is situated between an end portion of the nipple tube which contains radial openings 20 (one of which is shown in the drawing) by which the incoming pressure steam passes from the steam inlet 22 in the casing 10 to the annular elongated chamber 24 defined between the interior of the nipple tube and the exterior of an inner pipe 26. This pipe 26 extends concentrically within the nipple tube and is formed to extend along the length of the cylinder or the like to which the nipple tube is attached, the end of the pipe within the cylinder being fixed to the cylinder and the pipe carrying at its opposite end, within the joint casing 10, a gasket clamping ring 28.

The inner pipe 26 serves the purpose of a steam condensate return flow pipe, the direction of flow of the steam and the condensate being indicated by the arrows in the drawing.

The joint casing 10 is shown with a separate end cap 30 affixed to the casing by screw studs 32 and including between it (the end cap) and the adjacent end of the casing 10, a separate ring part 34 having diametral tongues 36 by which this ring is secured to the joint casing 10 by the adjustable screw bolts 38.

The ring 36 provides a radial wall surface 40 within the casing interior, at one end thereof, which wall surface 40 is located in axially spaced and opposed relationship with respect to a similar radial wall surface 42 defined upon an inturned flange 44 at the opposite end of the casing, said flange containing the nipple tube clearance opening 12.

46 and 48 indicate similar sealing rings, which may conveniently be of carbon graphite. These sealing rings have similar radial wall surfaces 50, 50' and similar but oppositely directed hemispherical surfaces 52, 52' held engaged with corresponding surfaces 54, 54' on a pair of axially spaced collar members 56, 56', respectively.

The collar 56' is fixed mounted upon the nipple tube 14, while the collar 56 is telescopically mounted upon the nipple tube through the medium of the axial sleeve portion 58 and has a counterbore 60 in which the clamping sleeve 28 enters to clamp the packing rings 62 in position about the condensate pipe 26, the clamping sleeve being adjustably secured upon the collar 56 by axial screw bolts, one of which is indicated at 64.

66 indicates a coil spring which bears between the collar 56 and the adjacent end of the bearing sleeve 18 and is located within an annular chamber 68 formed between the collar sleeve 58 and the adjacent interior wall surface of the joint casing 10.

70 indicates a screwed opening in the casing end cap 30, which opening serves for the connection of a flexible hose (not shown) for the discharge flow of the condensate, while 72 indicates an apertured lug on the joint casing by which adjacent pairs of such casings can be connected together by a stay rod (not shown) connected between the lugs on the casings, which stay rod prevents turning of the joint casings and relieves the connected flexible hose of strain and tension.

It will be noticed that the portion of the collar 56 with the counterbore 60 extends all round clearance through an opening 74 in the end ring 34 and that, further, the sealing rings 46 and 48 are permitted to partake of sliding movement with respect to and in the plane of the radial sealing surfaces 40, 50 and 42, 50'.

While in the specific description of this invention the conducted fluid has been described as pressure steam it is to be understood that the joint can be employed to handle other fluids, including hot and cold water, or other liquid, and that the direction of flow may be reversed compared with the direction indicated by the arrows in the drawing.

I claim:

In a rotary fluid sealed joint, a cylindrical casing having a fluid inlet opening and having at one end thereof an end wall with a central opening, a retainer ring, means detachably securing said retainer ring to the other end of said casing, an elongated nipple tube, an elongated, relatively non-deformable bearing sleeve concentrically mounting said nipple tube for rotation within said casing, said bearing sleeve being fitted over an intermediate portion of said nipple tube within the casing and defining an inner end portion of the tube opposite the casing fluid inlet opening, said tube extending at one end through said end wall opening with all round clearance, said extended tube end being adapted for connection with an external rotary part and said inner end portion of said tube having an opening therethrough permitting fluid to pass from said inlet into said tube, a collar member on said tube adjacent one end of said bearing sleeve, said sleeve end and collar member having mutually engaged radial surfaces to form a seal and said collar having a spherical surface, a relatively non-deformable sealing ring positioned between said collar and said casing end wall, said sealing ring having a spherical surface complementary to and engaged with said spherical collar surface and also having a radial wall surface engaged with said casing end wall for limited radial floating movement with respect thereto, a pipe concentrically arranged within said tube and defining with said tube an annular space along which fluid admitted to the nipple tube can pass, a second collar member secured on said pipe in sealed relationship therewith and having telescoped engagement with said inner end portion of said tube, said second collar also having a spherical sealing surface oppositely directed with respect to the spherical sealing surface of said first collar member, a second relatively non-deformable sealing ring having a spherical sealing surface complementary to and engaged with the spherical sealing surface on said second collar, said second sealing ring also having a radial sealing surface engaged with said retainer ring for limited radial floating movement with respect thereto, a coil compression spring extending axially between said second collar and said bearing sleeve for holding the said spherical and radial surfaces and said sealing rings in sealed engagement with respect to one another, said pipe terminating at one end adjacent said retainer ring, a separate end cap having an opening therethrough communicating with said pipe, and means detachably securing said end cap with respect to one end of said casing in position to maintain said communication and independently of said retainer ring securing means, whereby said end cap may be removed without disturbing said second sealing ring.

References Cited in the file of this patent

UNITED STATES PATENTS

| | | |
|---|---|---|
| Re. 23,298 | Monroe | Nov. 28, 1950 |
| 1,479,656 | Fetterley | Jan. 1, 1924 |
| 2,352,317 | Goff | June 27, 1944 |
| 2,385,421 | Monroe | Sept. 25, 1945 |
| 2,520,755 | Brown | Aug. 29, 1950 |
| 2,700,558 | Hieronymus | Jan. 25, 1955 |

FOREIGN PATENTS

| | | |
|---|---|---|
| 492,065 | Canada | Apr. 14, 1953 |